United States Patent [19]

Montagroni et al.

[11] 4,088,070
[45] May 9, 1978

[54] APPARATUS FOR EXTRACTING JUICE FROM CITRUS FRUITS

[76] Inventors: Nevio Montagroni, 4, Via Organi, Forli, Italy, 47100; Cesare Roda, 6, Via Ugo Bassi, Cesena, Italy, 47023

[21] Appl. No.: 740,524

[22] Filed: Nov. 10, 1976

[30] Foreign Application Priority Data

Nov. 11, 1975 Italy .............................. 12875 A/75

[51] Int. Cl.² .......................... B30B 9/20; B30B 3/04
[52] U.S. Cl. .................................... 100/121; 100/97; 100/210; 99/509; 198/415
[58] Field of Search .................... 99/495, 509; 100/97, 100/121, 153, 176, 177, 210; 198/415, 608, 840; 425/60, 404, 445; 38/143; 29/121.4; 69/42

[56] References Cited

U.S. PATENT DOCUMENTS

| | | | |
|---|---|---|---|
| 1,342,220 | 6/1920 | Lewis | 198/415 |
| 2,608,486 | 8/1952 | Arndt | 100/97 |
| 2,682,832 | 7/1954 | Lohre | 100/121 |
| 3,011,430 | 12/1961 | Bloomquist | 100/121 |
| 3,056,164 | 10/1962 | Reichel | 29/121.4 |
| 3,207,063 | 9/1965 | Major | 100/121 |

*Primary Examiner*—Harvey C. Hornsby
*Assistant Examiner*—Robert Pous
*Attorney, Agent, or Firm*—Pollock, Vande Sande & Priddy

[57] ABSTRACT

An apparatus for extracting juice from citrus fruits comprising a feeding conveyor for conveying the whole fruits to a cutting device, which cuts the fruits into halves. The fruit halves are fed into a squeezing tunnel with their cut surface oriented in a predetermined direction. The squeezing tunnel consist of two opposed surfaces which converge towards one another, thus effecting the squeezing of the fruit halves which are caused to travel therealong. One of the said surfaces is a portion of a rotating drum conveyor, while the other surface comprises a plurality of consecutive parallel rotating rollers arranged transversely with respect to the direction of travel of the fruit halves, and rotating at a peripheral speed which is higher than the speed of the drum conveyor. The rotating rollers are screw threaded with alternating right and left screw threads, or each rotating roller is provided with contiguous right and left screw threaded portions. In this manner, the fruit half, while being squeezed, is subjected to a stretching action, which prevents the rolling up or curling of the fruit half.

7 Claims, 10 Drawing Figures

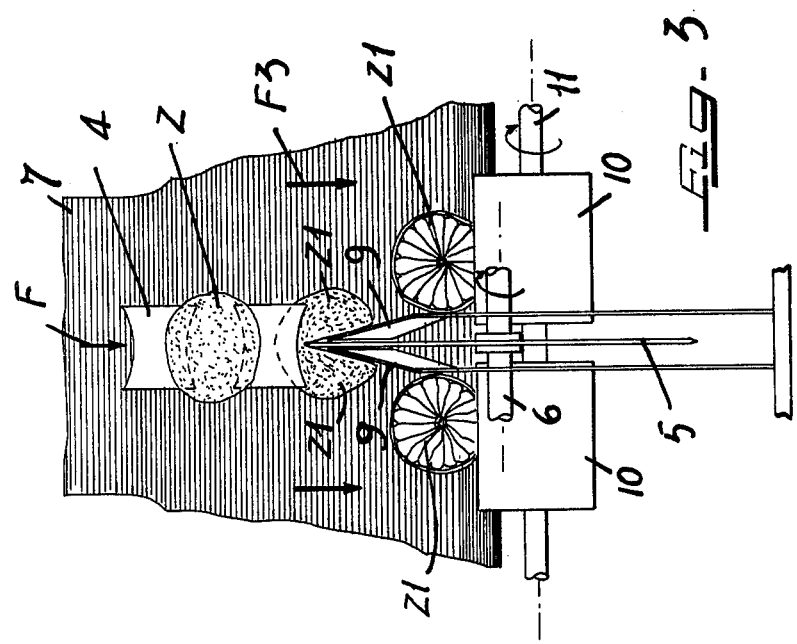

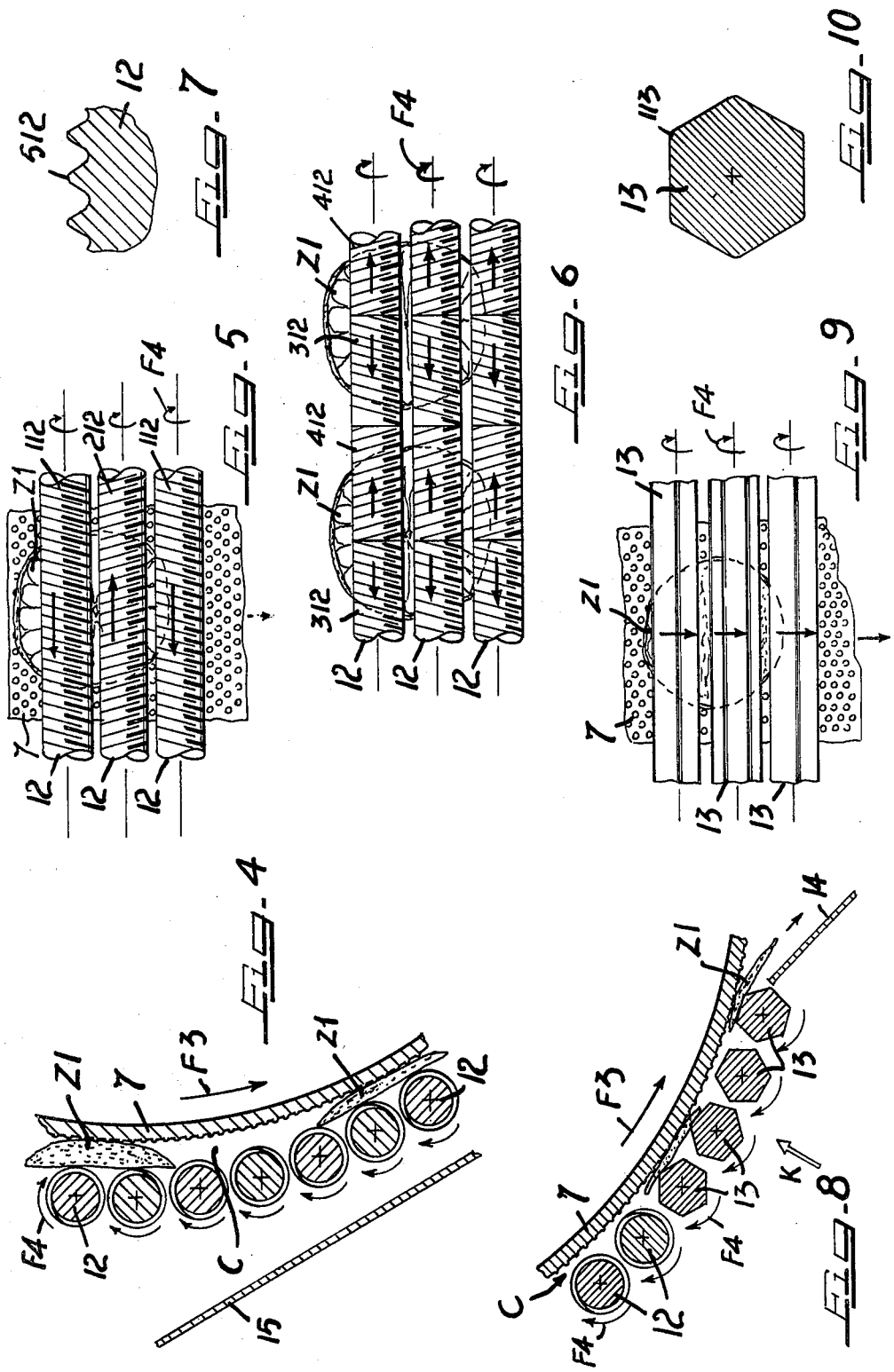

APPARATUS FOR EXTRACTING JUICE FROM CITRUS FRUITS

BACKGROUND AND SUMMARY OF THE INVENTION

The present invention relates to an apparatus for extracting juice from citrus fruit, of the type in which the citrus fruits are cut into halves, and the fruit halves are caused to travel, oriented with their cut flat surfaces (presenting the pulp) in a predetermined direction, through a squeezing tunnel defined by two opposed surfaces which converge towards one another, so that the fruit halves are compressed and the juice and pulp are extracted, while the exhausted peels are discharged at the end of the squeezing tunnel.

There is known apparatus of the type in which the fruit halves are caused to travel along a squeezing tunnel which presents a fixed surface generally consisting of a grid-like or perforated wall, along which the cut surface (presenting the pulp) of the fruit half is pressed, so that the juice and pulp are expelled through the grid or perforations, while the other surface or wall of the squeezing tunnel consists of a portion of a rotating conveyor drum, the surface of which contacts the hemispherical or "peel" side of the fruit, thus causing the fruit to move along the squeezing tunnel, while progressively pressing them against the fixed surface. These known apparatuses, however, have the disadvantage that frequently the fruit halves, during their travel in the squeezing tunnel, as a consequence of the relative motion between the two surfaces, have the tendency to roll up or curl, thus causing obstruction of the tunnel. The rolling up and curling of the fruit halves moreover causes the rupturing of the fruit peel, and the expulsion of the peel oils which get mixed with the juice and therefore spoil its quality.

According to the present invention the apparatus for extracting juice from citrus fruit comprises a squeezing tunnel defined by two opposed converging surfaces one of which consists of a portion of the side surface of a rotating drum, which is intended to contact the peel side of the fruit, while the other one is constructed as a series of consecutive parallel rotating rollers arranged transversely with respect to the direction of movement of the first surface, which rollers are screw threaded on their side surface, and preferably present alternately right screw threads and left screw threads, or the same roller may present contiguous right screw thread and left screw thread sections.

In this manner, the fruit half which passes through the tunnel is subjected to the feeding action of the rotating rollers, the peripheral speed of which is higher than the speed of the surface of the rotating drum, and to a sidewise stretching action caused by the screw thread design of the rotating rollers, so that the rolling up and curling of the fruit halves is avoided, while at the same time a quicker and more efficient squeezing of the said fruits is obtained.

The above and other features of the invention will be clearly understood from the following description of a preferred embodiment of same, made with reference to the accompanying drawings.

BRIEF DESCRIPTION OF THE DRAWINGS

FIG. 3 shows diagrammatically and in plan view one of the cutting stations for the fruits;

FIG. 4 is a side view with parts in section of the initial portion of the squeezing tunnel;

FIGS. 5 and 6 show two different embodiments of a detail of the initial portion of the squeezing tunnel;

FIG. 7 is an enlarged view showing in section a detail of the screw thread of the rotating rollers;

FIG. 8 is a side view with parts in section of the terminal portion of the squeezing tunnel;

FIG. 9 is a view of the terminal portion of the squeezing tunnel as viewed from arrow K of FIG. 8;

FIG. 10 is a section of one of the polygonal rotating rollers of the terminal portion of the squeezing tunnel.

DESCRIPTION OF THE PREFERRED EMBODIMENT

Figure 1:
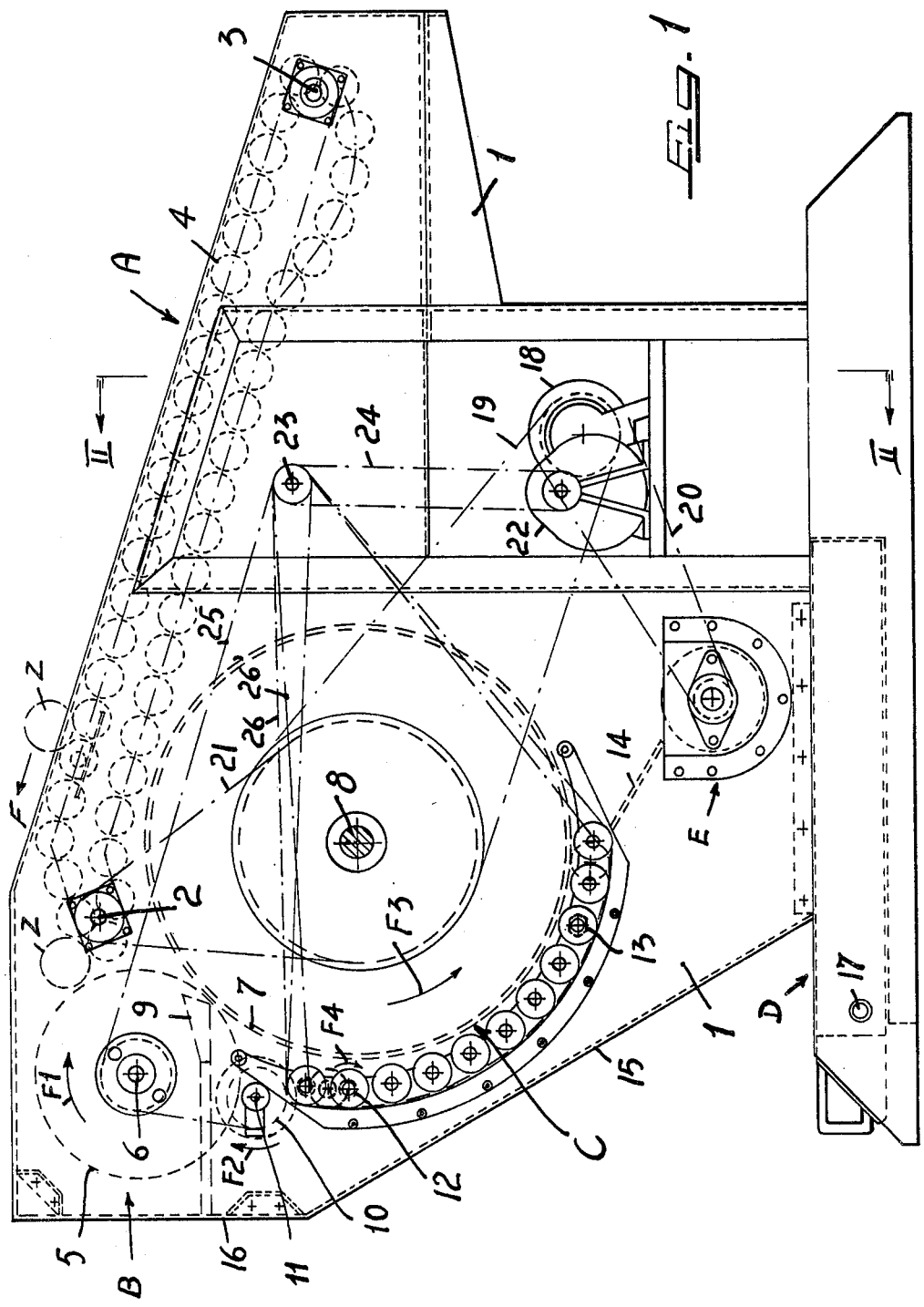
FIG. 1 is a side elevation view of the apparatus, where the transmissions to the operating parts have been evidenced in a particular manner.
Figure 2:
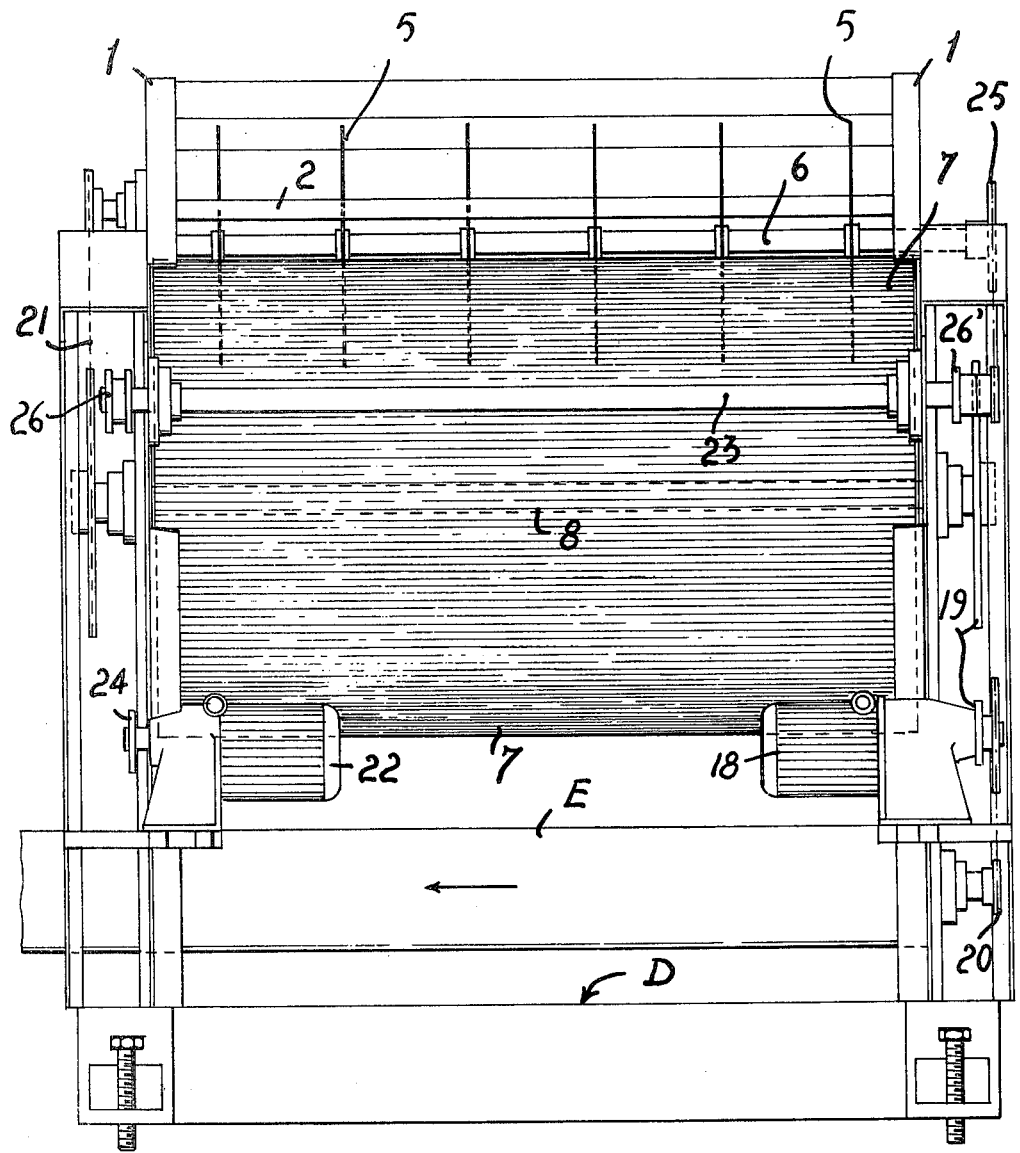
FIG. 2 represents the machine in a view taken along line II—II of FIG. 1.

With reference to FIGS. 1 and 2, it is noted that the apparatus comprises two parallel side members 1 rigidly secured in vertical position by means of suitable frame cross members, and shaped as illustrated in FIG. 1 so as to obtain a supporting frame inside which there are arranged means A for conveying the citrus fruits aligned one after the other along several parallel lines, means B for cutting the citrus fruits into halves, means C for squeezing the said fruit halves, means D for collecting the juice and pulp obtained by the squeezing operation and means E for collecting and expelling the exhausted peels out of the apparatus. On the said frame there are also housed the driving means and transmissions for the operation of the apparatus itself.

The means A for conveying and feeding the citrus fruits are of known type and preferably consist of a chain conveyor comprising endless chains guided around a pair of parallel shafts 2, 3 and carrying a plurality of consecutive transverse bars, each bar being provided with equispaced rollers 4 presenting a groove such as to form a shallow annular recess (see also FIG. 3), means (not illustrated) being provided for causing the rotation of said rollers 4 around their axis along the upper run of the conveyor A, in an anticlockwise direction (as seen in FIG. 1) so that each fruit carried by a pair of consecutive rollers 4 aligned along the direction of movement F of the conveyor and carried by two consecutive transverse bars (see particularly FIG. 3), is compelled to roll so as to dispose itself with its major axis transversely with respect to the direction of movement of the conveyor.

The upper section of the active run of conveyor A presents a descending portion so that the rollers 4, by travelling around shaft 2, push the fruit Z which is carried by them against the cutting device consisting of the rotary blade 5, which cutting device cuts the fruit into two substantially equal halves. The cutting device comprises a plurality of rotary blades 5 keyed onto the shaft 6 which is caused to rotate in the direction indicated by arrow F1. The number of rotary blades 5 corresponds to the number of rows of aligned rollers 4 carried by each transverse bar of the conveyor A.

The rotary blades 5 are arranged in close proximity to the side surface of a drum 7, which rotates around shaft 8 which is suitably supported by the apparatus frame and which is parallel to shafts 2, 3 and 6. The side surface of drum 7 is rendered rough by projections which however are not so sharp as to perforate or cut the peel of the citrus fruit, since this rough side surface of the drum is intended to cooperate with the peel of the fruit, and the incision or rupturing of this peel must be avoided in order to prevent ejection of the peel oil. The projections on the side surface of the drum may be rounded or even of hemispherical shape.

The drum 7 rotates in the direction indicated by arrow F3 and with a peripheral speed less than that of rotary blades 5. By looking particularly at FIGS. 1 and 3 it can be appreciated that each fruit Z is taken by the rotary blade 5 and is deposited, by the cooperating action of the movement of said blade 5 and of the roller 4, onto the underlying drum 7, not yet completely cut into two halves. The fruit Z therefore comes into contact with drum 7, which latter pushes same further against the blade 5, while the resulting halves Z1 come into contact with two fixed deflector elements 9 which are arranged at the sides of the said blade 5 and secured to the apparatus frame. In this manner the fruit halves are positioned so that their hemispherical peel surfaces are brought into contact with the surface of drum 7. The fruit halves Z1, after having being correctly positioned by the deflector elements 9, are subjected to the action of the feeding rollers 10, keyed on a transversal shaft 11 and positively rotated in the direction of arrow F2. The feeding rollers 10 facilitate the introduction of the fruit halves Z1 into the squeezing tunnel and simultaneously assure the initial contact of the peel of the fruit with the rough surface of the drum.

Under the combined action of the drum 7 and of the feeding rollers 10, the fruit halves Z1 are introduced into the squeezing tunnel C defined by two opposing surfaces which progressively converge with one another, one of said surfaces consisting of a portion of the side surface of rotating drum 7 which moves in the direction of the narrower section of the squeezing tunnel, while the other surface, which is the surface properly intended for the juice and pulp extraction, is a composite surface and it consists of a series of screw threaded rollers 12 (see also FIG. 4) arranged in consecutively order, with their axis parallel to the axis of shaft 8 of the drum 7. The said other surface terminates with a series of rollers 13 (see also FIG. 8) having a polygonal section, which also are arranged consecutively, and are parallel to the threaded rollers 12. The said rollers 12 and 13 are rotatably mounted by their ends onto the apparatus frame, and are positively driven into rotation in the direction indicated by arrow F4, their peripheral speed being greater than the peripheral speed of the side surface of drum 7.

With particular reference to FIG. 5, it will be noted that the threaded rollers 12 can alternately present a right screw thread and a left screw thread, as indicated respectively by reference numerals 112 and 212, in such a manner that the fruit half Z1, which is compressed simultaneously by at least two consecutive threaded rollers 12, at the same time is subjected to the action of two transversely opposed stretching forces, thus avoiding any possibility of curling or rolling up of the fruit at the interior of the squeezing tunnel.

FIG. 6 shows another embodiment of the threaded rollers 12, according to which the said rollers each have several contiguous portions of right screw threads 312 and left screw threads 412, so that the fruit halves Z1 are simultaneously subjected by the same roller to the action of diverging stretching forces, thus avoiding the curling or rolling up of the fruit, and favoring its opening, which is advantageous for a more effective extraction of the juice and pulp.

The screw threaded rollers 12 do not have a deep thread, so that they are substantially self-cleaning due to the effect of their rotational speed. The apex 512 of the thread (see FIG. 7) is rounded, so as to avoid any cutting of the fruit, particularly in the final portion of the squeezing tunnel, where the threaded rollers come in proximity with the peel and albedo of the fruit half.

The fruit halves Z1 introduced into the squeezing tunnel are progressively squeezed so as to extract the juice and pulp by the combined action of the side surface of drum 7 and of the threaded rollers 12. They are then subjected (FIGS. 8 and 9) to a finishing action by the polygonal rollers 13 which squeeze and skim off from the interior of the fruit the remaining parts of pulp and juice which were not extracted previously. As can be appreciated from FIG. 10, the edges 113 of the polygonal rollers 13 are rounded to prevent the cutting and rupturing of the peel of the fruit.

On emerging from the squeezing tunnel C, the exhausted peels are discharged along an inclined chute 14 into a screw conveyor E, which discharges the said peels into any suitable container outside of the apparatus frame. Below the squeezing tunnel C and the discharge conveyor E there is arranged a collecting vat D, which serves for collecting the juice and pulp directly falling down from the squeezing tunnel and flowing along walls 15 and 16, as well as from the said conveyor E. The latter may have a perforated side wall, in order to enable residual juice resulting from the compression of the exhausted peels being conveyed to the discharge to drip into vat D. The pulp and juice are discharged from the said collecting vat through a suitable suction duct 17, of any known type.

The means for driving the different operating parts of the apparatus are illustrated in FIGS. 1 and 2. More particularly, the motor 18 rotatably drives drum 7 via transmission 19, and screw conveyor E via transmission 20. The feeding conveyor A is driven, through any suitable transmission 21, by the drum 7.

Another motor 22 drives, through an intermediate shaft 23 onto which are keyed suitable pulleys or sprocket wheels, the shaft 6 for the rotary blades 5 and the shaft 11 for the feeding rollers 10 (through transmission 25) and (through transmissions 26, 26') the threaded rollers 12 and the polygonal rollers 13.

In order to adapt the apparatus for the processing of citrus fruits of different sizes and peel thicknesses (oranges, lemons, grapefruit, etc.) means (not shown) are provided for adjusting the distance between the two surfaces defining the squeezing tunnel. Preferably, provision is made for the adjustment of the drum 7 and consequently of the blades 5, both in the vertical and in the horizontal direction, by acting on the bearing supports of the shafts 8 and 6. The adjustment devices are not illustrated since they are easily conceivable by a person skilled in the art.

It is believed that the invention will have been clearly understood from the foregoing detailed description of a preferred embodiment. Changes in the detail of construction may be resorted to, without departing from the spirit of the invention, and it is accordingly intended that no limitation be implied and that the hereto annexed claims be given the broadest interpretation of which the employed language fairly admits.

We claim:

1. Apparatus for extracting juice from citrus fruits of the type in which previously cut fruit halves, are caused to travel through a squeezing tunnel defined by two opposed converging surfaces, including means for orienting said fruit halves with their cut flat surfaces in a predetermined direction, said squeezing tunnel comprising:

(a) a moving endless surface, consisting of a portion of an endless conveyor moving in a direction from the inlet to the outlet of the squeezing tunnel and arranged to be in continuing contact with the hemispherical peel side of the fruit half, said moving endless surface being constructed as a friction surface capable of frictionally engaging the peel of the fruit half;

(b) a fixed surface arranged to be in continuing contact with the cut flat surface of the fruit half, said fixed surface consisting of a plurality of consecutive rotating rollers arranged with their axes transversely with respect to the direction of travel of the fuit halves in the squeezing tunnel, said rollers having a diameter and being arranged in a manner such that the flat surface of each fruit half travelling through the squeezing tunnel is always contacted by at least two consecutive rollers, the said rollers rotating so as to convey the contacting fruit halves towards the outlet of the squeezing tunnel, and having a peripheral speed which is greater than that of the moving endless surface, whereby curling of the peels is reduced;

(c) means to rotate said endless conveyor and to rotate said rollers at a peripheral speed greater than that of the endless conveyor.

2. An apparatus according to claim 1, in which the rotating rollers are screw threaded, the apex of the threads being sufficiently blunted to prevent cutting of the fruit.

3. An apparatus according to claim 2, in which the consecutive rotating rollers have alternate right hand and left hand screw threads.

4. An apparatus according to claim 2, in which each rotating roller has contiguous portions of right and left hand screw threads.

5. An apparatus according to claim 1, in which the rotating rollers at the terminal portion of the squeezing tunnel have a polygonal cross section, for contacting the interiors of the fruit halves for removing residual pulp and juice therefrom, while the other preceding rotating rollers have a circular section and a screw threaded surface.

6. An apparatus according to claim 1, in which the moving endless surface is a portion of the side surface of a drum, said side surface having thereon suitable projections so as to constitute a friction surface.

7. An apparatus according to claim 6, in which the projections are sufficiently blunted to prevent piercing or cutting the peel of the fruit.

* * * * *